US011536381B2

(12) United States Patent
Schneider et al.

(10) Patent No.: US 11,536,381 B2
(45) Date of Patent: Dec. 27, 2022

(54) DYNAMIC CONTROL VALVE ASSEMBLY

(71) Applicant: Green CO2 IP, LLC, Fort Collins, CO (US)

(72) Inventors: Daniel Schneider, Worland, WY (US); David Schneider, Worland, WY (US)

(73) Assignee: Green CO2 IP, LLC, Fort Collins, CO (US)

( * ) Notice: Subject to any disclaimer, the term of this patent is extended or adjusted under 35 U.S.C. 154(b) by 63 days.

(21) Appl. No.: 17/241,387

(22) Filed: Apr. 27, 2021

(65) Prior Publication Data
US 2022/0341498 A1 Oct. 27, 2022

(51) Int. Cl.
*F16K 15/02* (2006.01)
*F16K 11/10* (2006.01)
*F16K 21/00* (2006.01)
*F17C 13/04* (2006.01)

(52) U.S. Cl.
CPC ............ *F16K 11/105* (2013.01); *F16K 21/00* (2013.01); *F17C 13/04* (2013.01); *F17C 2205/0323* (2013.01); *F17C 2221/013* (2013.01); *F17C 2223/013* (2013.01); *F17C 2250/043* (2013.01)

(58) Field of Classification Search
CPC ........ F16K 11/105; F16K 21/00; F17C 13/04; F17C 2205/0323; F17C 2221/013; F17C 2223/013; F17C 2250/043
See application file for complete search history.

(56) References Cited

U.S. PATENT DOCUMENTS

| 3,567,175 A | 3/1971 | Sciuto |
| 3,583,667 A | 6/1971 | Amneus |
| D248,041 S | 5/1978 | Persson |
| (Continued) | | |

OTHER PUBLICATIONS

Notice of Consideration from U.S. Appl. No. 16/452,806.
Photograph of fill gun believed to have been in use since 2012.
International Search Report for PCT/US2019/062784.

*Primary Examiner* — P. Macade Nichols
(74) *Attorney, Agent, or Firm* — Talus Law Group LLC

(57) ABSTRACT

A dynamic control valve assembly for use in filling a liquid carbon dioxide storage and gas delivery system is provided, the assembly comprising: a valve body; an end nut with an inlet port for receiving liquid carbon dioxide; a chamber; an inlet cavity; a liquid port; a gas port; and a dynamic compound valve stem assembly for blocking the gas port while liquid carbon dioxide is delivered through the inlet port and allowing the liquid carbon dioxide to flow through the liquid port for storage in a liquid cylinder, and open the gas port and block the inlet port in order to allow carbon dioxide gasses from boiling liquid carbon dioxide within the liquid cylinder to pass through the gas port for storage in a gas cylinder until system pressure and temperature equilibrium is reached. The dynamic compound valve stem assembly comprises: a stem body having an inlet port poppet and a gas port poppet; an inlet cavity collar; and in some embodiments a collar biasing spring. The compound valve assembly is adapted to block the inlet port upon completion of the delivery of liquid carbon to the system when the system has an initial low pressure. The carbon dioxide gas may then be drawn from the gas cylinder for use in use in carbonated beverages and other applications such as agricultural and medical uses.

20 Claims, 4 Drawing Sheets

(56) References Cited

U.S. PATENT DOCUMENTS

| | | | |
|---|---|---|---|
| D314,050 S | 1/1991 | Sone | |
| 5,088,436 A | 2/1992 | Stritmatter | |
| 5,167,398 A | 12/1992 | Wade et al. | |
| 7,258,127 B1 | 8/2007 | Schneider | |
| D661,785 S | 6/2012 | Johnson | |
| 8,356,794 B1 * | 1/2013 | Liu | F16L 37/23 251/149.6 |
| 8,377,010 B2 | 2/2013 | Harding et al. | |
| 8,641,013 B2 | 2/2014 | Liu | |
| 8,641,605 B2 | 2/2014 | Shoroji et al. | |
| D701,111 S | 3/2014 | Bianco et al. | |
| 8,844,555 B2 | 9/2014 | Schneider | |
| D721,266 S | 1/2015 | Sun | |
| 9,017,295 B2 | 4/2015 | Pan | |
| 9,168,203 B2 | 10/2015 | Rosenquist et al. | |
| D780,891 S | 3/2017 | Endo | |
| 9,933,094 B2 | 4/2018 | Fangrow | |
| D841,782 S | 2/2019 | Wada | |
| 10,371,318 B2 | 8/2019 | Schneider | |
| 2013/0320673 A1 | 12/2013 | Hopson | |
| 2015/0157848 A1 | 6/2015 | Wu et al. | |
| 2015/0247594 A1 | 9/2015 | Vijayadevaraj et al. | |
| 2017/0023179 A1 | 1/2017 | Schneider | |
| 2017/0284603 A1 * | 10/2017 | Song | F17C 1/00 |

\* cited by examiner

DYNAMIC CONTROL VALVE ASSEMBLY

TECHNICAL BACKGROUND

The present invention relates generally to the field of systems used to supply carbon dioxide gases for beverage, agricultural, medical, and other fields.

BACKGROUND OF THE INVENTION

U.S. Pat. Nos. 7,258,127, 8,844,555 and 10,371,318, incorporated herein by reference, describe and address some of the problems with the prior art and provide a diverter valve system and method for the delivery of liquid carbon dioxide where delivery persons can fill the system without having to enter the building and the system can continue to deliver gas to the user. There is no interruption of service while the system is being filled. In normal operation, these systems are filled using a fill truck that supplies liquid carbon dioxide under pressure of about 800 to 1150 PSI to an inlet port of a diverter valve. This fill pressure pushes a shuttle valve away from an inlet port seat until it rests on a vapor port seat in the diverter valve, thus preventing liquid carbon dioxide from entering a vapor cylinder. A cut-off pressure switch on the fill truck monitors the filling pressure and shuts off the pump on the truck when a pre-determined pressure is detected. The truck operator then vents the fill line which causes pressure on the inlet side of the shuttle valve to drop to atmospheric pressure. This pressure drop, when there is sufficient vapor cylinder pressure, causes the shuttle valve to move back towards the inlet port seat until it shuts off the inlet port. Liquid carbon dioxide may then boil off and pass through the vapor port to fill a vapor cylinder.

However, a disadvantage of the diverter valve systems disclosed by U.S. Pat. Nos. 7,258,127, 8,844,555 and 10,371,318 is presented when attempting to fill the system with a low vapor cylinder pressure at the beginning of the filling process. In this situation, the vapor cylinder pressure cannot overcome the increased pressure in the liquid cylinder that was just filled and the pressure differential causes the shuttle valve to remain seated on the vapor port seat and prevents the shuttle valve from closing the inlet port at the completion of the fill process. This requires the fill truck operator to enter into the building premises and manually trip the system which can be disruptive to the customer and is more time consuming. Moreover, the need to have access to the system also requires that carbon dioxide deliveries be made during normal business hours when the customer can allow access to the premises. This significantly reduces the times of day when deliveries can be made. Preferably, deliveries should be made when the customer's business is closed and there is less traffic on the roads, thereby allowing faster and safer travel between customer locations. In another example, some customers prohibit access to their facilities by outside venders without significant safeguards and this can delay access for delivery services.

One possible solution to this problem is to use a spring to bias the shuttle valve towards the inlet port. However, this solution is unreliable because of the extreme low temperatures (about –60° F.) that are generated by delivery of liquid carbon dioxide. These low temperatures can freeze the spring in a compressed position during the fill process. Thus, the frozen spring cannot return the shuttle valve to a closed position at the completion of the fill process.

For at least the foregoing reasons, there is a need for a reliable apparatus for filling a liquid carbon dioxide storage and gas delivery system that reliably closes the system upon completion of the fill process even with low initial vapor cylinder pressure.

SUMMARY OF THE INVENTION

For a better understanding of this invention, its operating advantages and the specific objects attained by its uses, reference should be had to the accompanying drawings and description which there is illustrated a preferred embodiment of this version of the invention.

In one non-limiting embodiment of the invention, the invention provides a control valve assembly for receiving and directing the flow of pressurized liquid carbon dioxide to at least one liquid storage cylinder and gaseous carbon dioxide to at least one gaseous storage cylinder where the gaseous carbon dioxide may be drawn through a user port for use by a user, the control valve assembly comprising: a valve body; an end nut with an inlet port for receiving liquid carbon dioxide; an inlet cavity; at least one liquid port; a gas port; and a dynamic compound valve stem assembly for blocking the gas port while liquid carbon dioxide is delivered through the inlet port and allowing the liquid carbon dioxide to flow to a liquid port for storage in the liquid storage cylinder, and open the gas port and block the inlet port in order to allow carbon dioxide gasses from boiling liquid carbon dioxide within the liquid storage cylinder to pass through the gas port for storage in the gaseous storage cylinder until pressure and temperature equilibrium in the system is reached. The control valve assembly according to the present invention may further include a pressure gauge for monitoring the pressure within the control valve assembly. The dynamic compound valve stem assembly comprising: a stem body having an inlet port poppet at a first end and a gas port poppet at a second end; and an inlet cavity collar slideably interconnected to the valve stem body between the first and second poppets. The dynamic compound valve stem assembly according to the present invention may further include a biasing spring adapted to slideably bias the inlet cavity collar towards the inlet port poppet.

The advantages of the present invention will be clarified in the description of the preferred embodiments taken together with the attached figures.

BRIEF DESCRIPTION OF THE DRAWINGS

Other objects and advantages appear in the following description and claims. The drawings illustrate some practical embodiments of the present invention, without intending to limit the scope of the invention or the included claims.

DETAILED DESCRIPTION OF THE PREFERRED EMBODIMENTS

Figure 1:
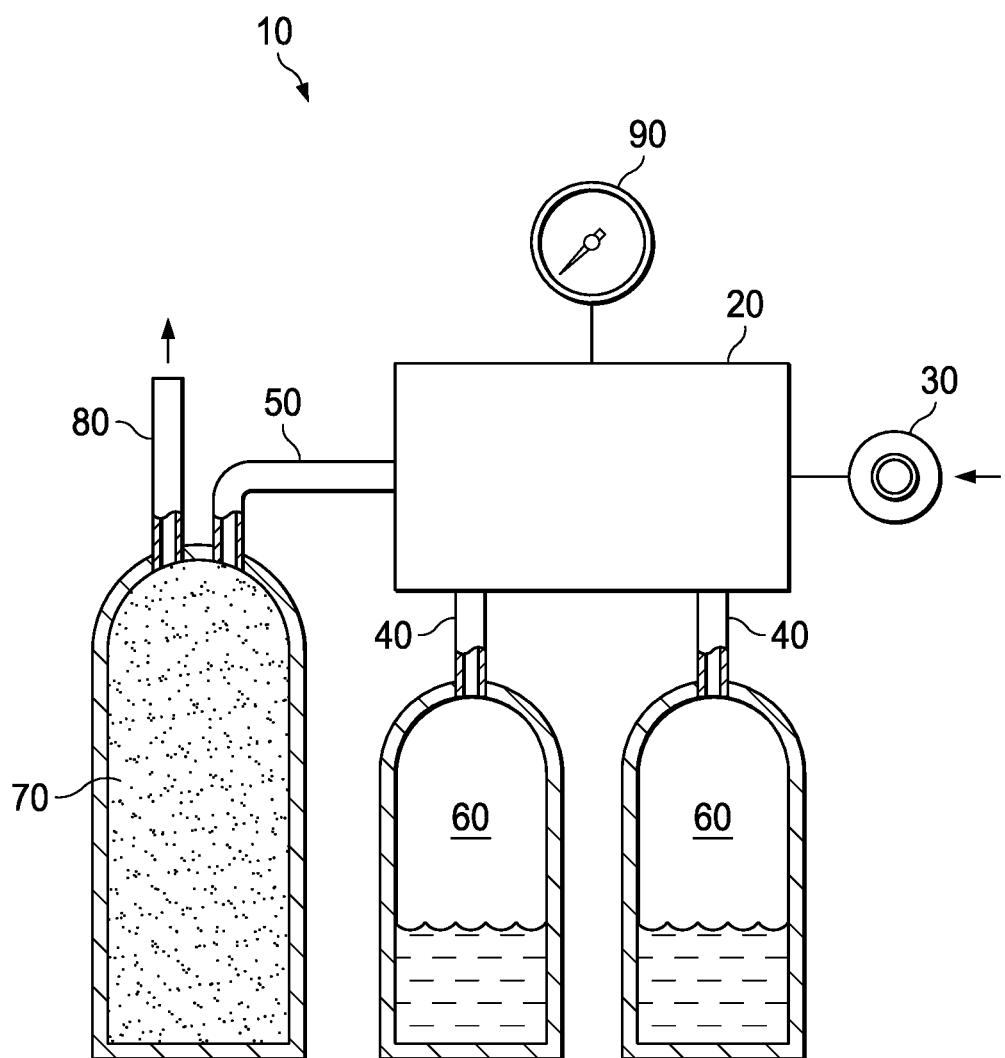
FIG. 1 schematically illustrates the general arrangement of one embodiment of the control valve assembly in a liquid carbon dioxide storage and gas delivery system according to the present invention.

FIG. 1 schematically illustrates the general arrangement of one embodiment of the carbon dioxide liquid delivery and gas storage system according to the present invention. The system includes a control valve assembly 10, valve body 20, fill port 30, one or more liquid ports 40, gas port 50, one or more liquid storage cylinders 60, a gaseous storage cylinder 70, a user port 80, and a pressure gauge 90. While FIG. 1 shows two liquid storage cylinders 60 it should be understood that only one cylinder or more than two liquid cylinders could be utilized in other embodiments. Similarly, only one gaseous storage cylinder 70 is shown. It should be understood that more gaseous storage cylinders 70 could be utilized in other embodiments. Likewise, while only one user port 80 is shown, there could multiple user ports 80 in other embodiments. While many liquid storage cylinders and gaseous storage cylinders could be attached to the system it is preferrable to maintain the liquid storage cylinder to gaseous storage cylinder ratio of two to one when the cylinders are about the same volume.

Figure 2B:
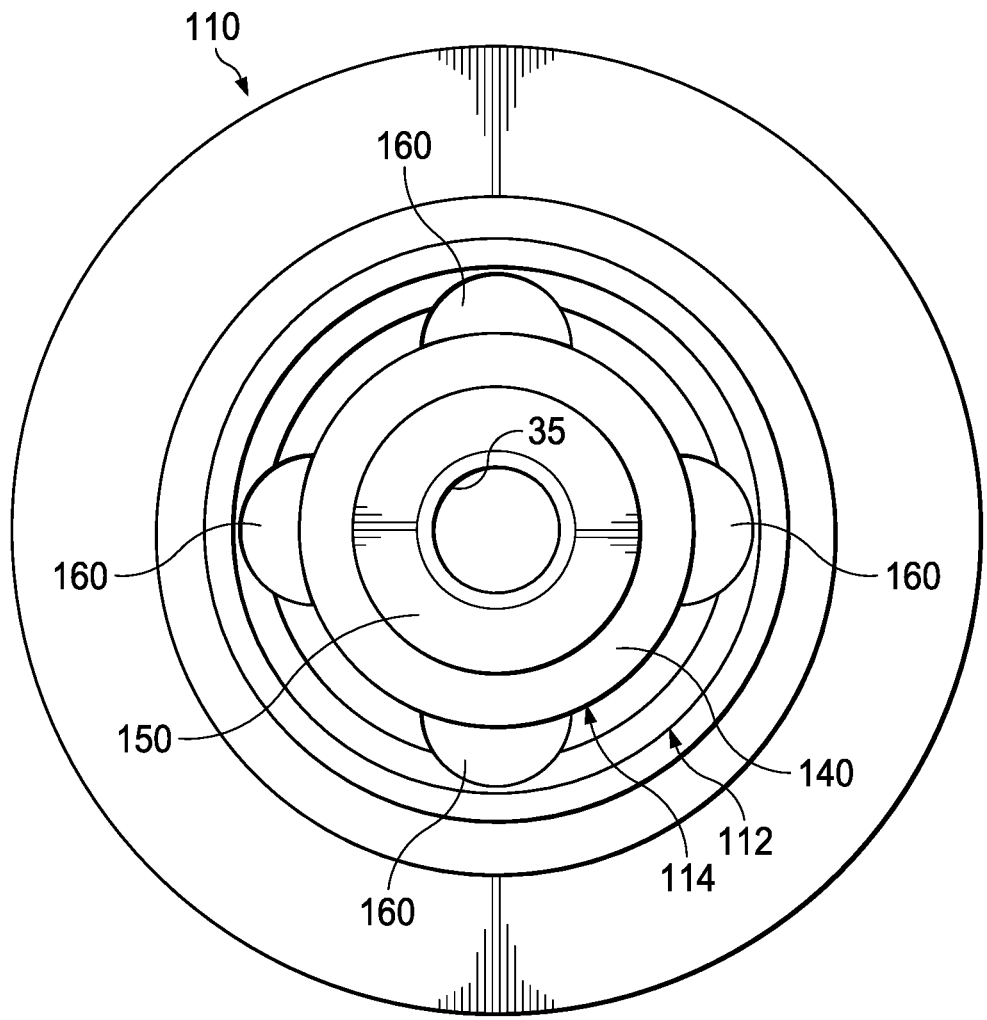
FIG. 2B illustrates an internal view of one embodiment of the end nut of the present invention.
Figure 3A:
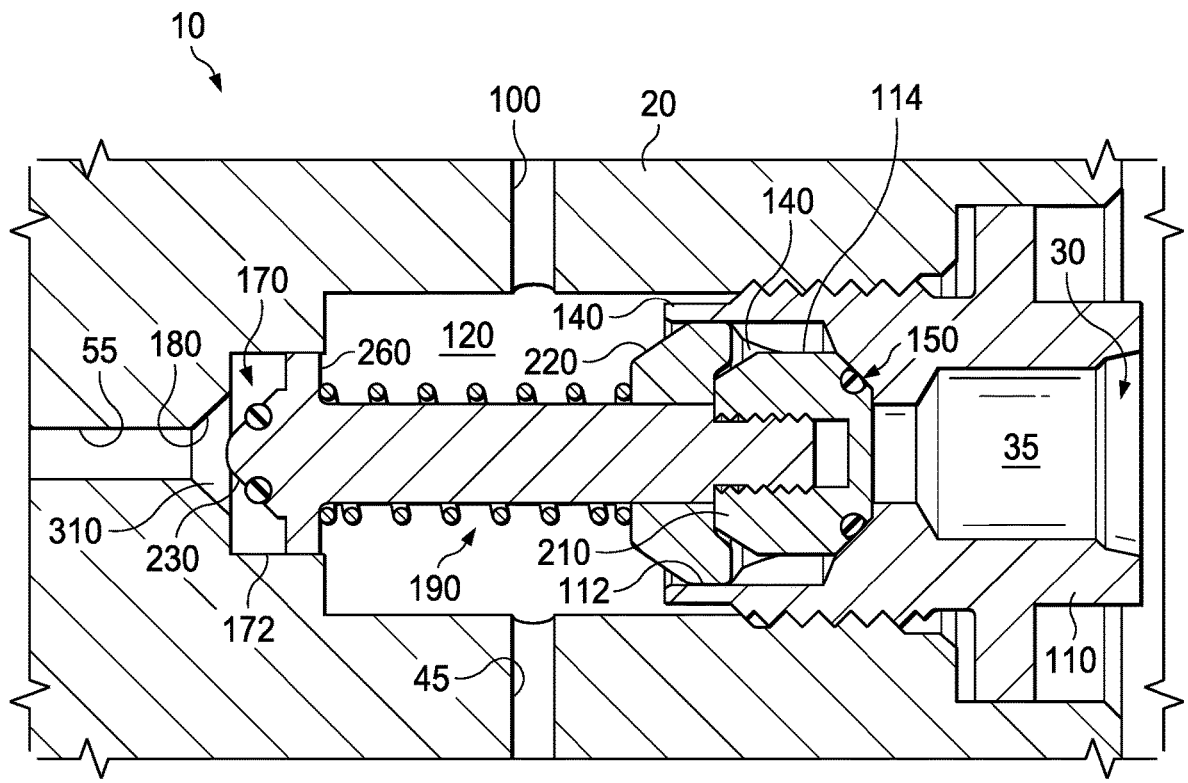
FIG. 3A illustrates a partial cutaway view of one embodiment of the control valve assembly of the present invention in a closed position.
Figure 3B:
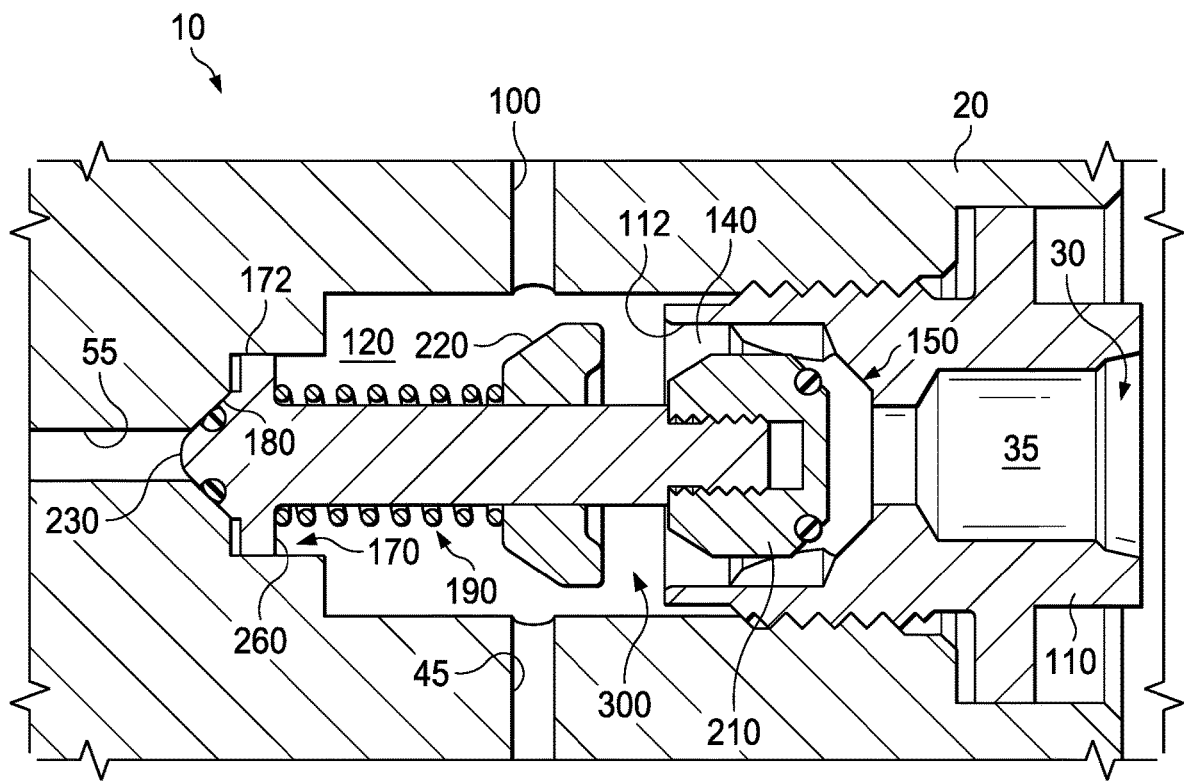
FIG. 3B illustrates a partial cutaway view of one embodiment of the control valve assembly of the present invention in an open position.

FIGS. 3A and 3B illustrate a partial cutaway view of one embodiment of the valve body 20 in closed and open positions, respectively. The control valve assembly 10 comprises a valve body 20, an end nut 110 which is thread into valve body 20 to form a chamber 120. The end nut 110 comprises an inlet port 35 in fluid communication with fill port 30 for receiving liquid carbon dioxide into the valve body 20. The fill port 30 may be formed within the end nut 110 or may be fluidly connected to the end nut 110 by a hose or pipe as shown schematically in FIG. 1. As shown in FIG. 2B, the end nut 110 comprises a liquid inlet cavity 140, an inlet seat 150, and one or more flow grooves 160. End nut 110 is preferably made from anodized aluminum.

The valve body 20 includes one or more liquid ports 45 and a gas port 55. The liquid ports 45 and a gas port 55 are adapted to allow direct connections, i.e., threaded, to storage cylinders or may be connected to the storage cylinders by hoses or pipes as shown schematically in FIG. 1. The valve body 20 may further include a pressure port 100 in fluid communication with a pressure gauge 90 for monitoring the pressure within the control valve assembly 10. The pressure gauge 90 may be threaded into the valve body 20 or, alternatively, may be located remotely and connected to valve body 20 by a hose, pipe, or electrical signal wire as shown schematically in FIG. 1. The valve body 20 is preferably made from aluminum.

Figure 2A:
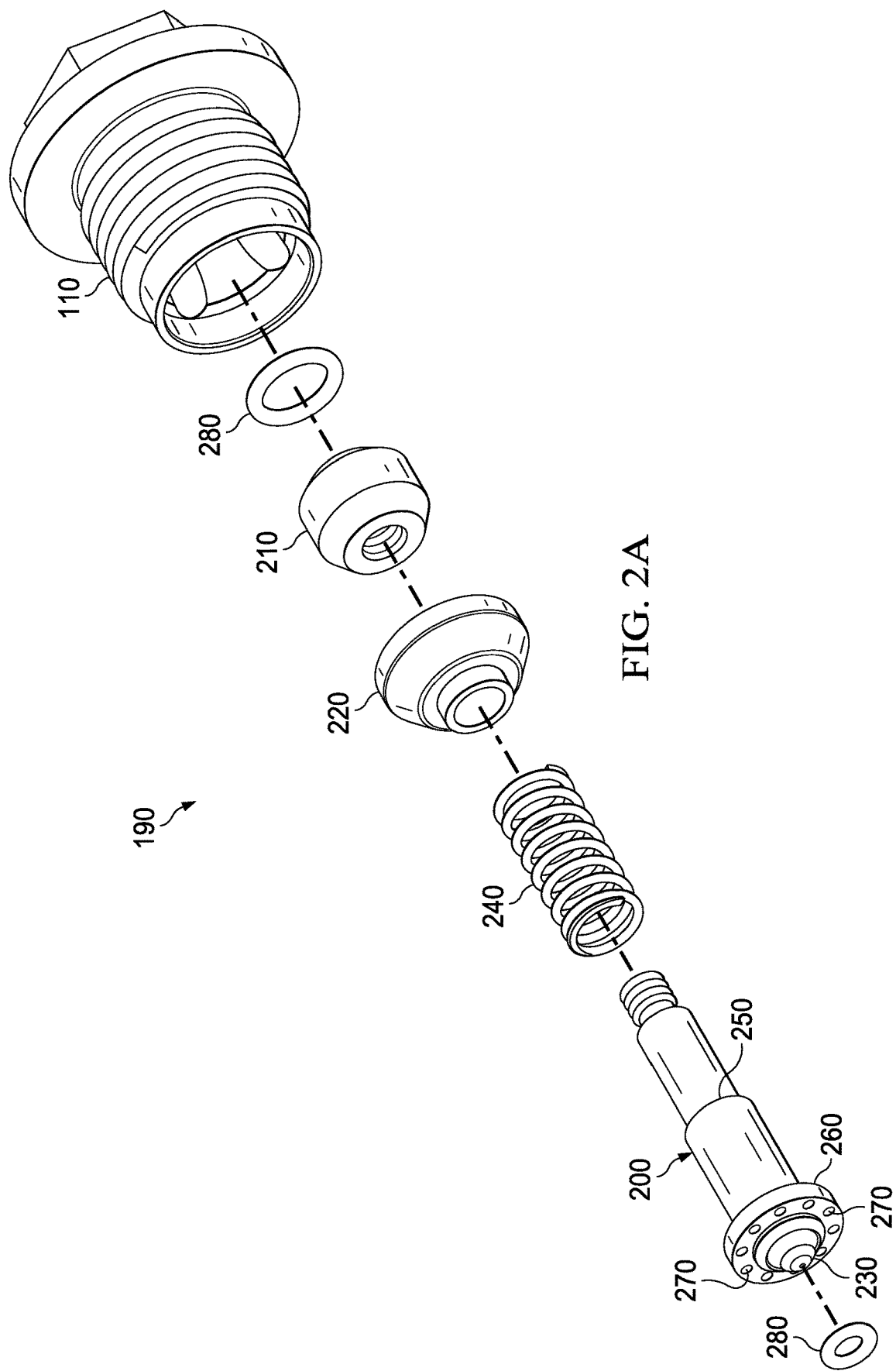
FIG. 2A illustrates an exploded perspective view of one embodiment of the dynamic compound valve stem assembly and end nut of the present invention.

FIG. 2A illustrates the dynamic compound valve stem assembly 190. The dynamic compound valve stem assembly 190 comprises a stem body 200 that is threaded to an inlet port poppet 210 at one end. At the opposite end, the stem body 200 includes a gas port poppet 230 having an integral gas port cavity collar 260. In an alternative embodiment, the dynamic compound valve stem assembly 190 comprises a stem body 200 with an integral inlet port poppet 210 at one end, and with the gas port poppet 230 threaded to the opposite end of the stem body 200. In yet another alternative embodiment, both the inlet port poppet 210 and gas port poppet 230 are threaded to the stem body 200. The inlet port poppet 210 and gas port poppet 230 may also be affixed to the stem body 200 by pinning, welding, gluing, or other attachment methods. The inlet port poppet 210 and gas port poppet 230 each comprise an o-ring 280 for sealing the poppets against their respective inlet seat 150 and gas port seat 180. In a preferred embodiment, o-rings 280 are comprised of Teflon. As shown in FIG. 2A, the gas port cavity collar 260 comprises one or more gas passageways 270 which allow for passage of gaseous carbon dioxide to gas port 55.

An inlet cavity collar 220 is slideably interconnected to the stem body 200. A collar biasing spring 240 is slideably interconnected to the stem body 200 between the gas port cavity collar 260 and the inlet cavity collar 220. In a preferred embodiment, the stem body 200 has a first portion having a first diameter and a second portion having a second diameter, the change in diameters creating a shoulder stop 250 between the first and second portions. It will be appreciated that the stop could be achieved by other structures such as by a ring around the stem body 200, by one or more tab elements, or by one or more pins protruding from the stem body 200. The hole through the inlet cavity collar 220 is sized to slide over the first portion but not the second portion. The stop 250 thereby prevents full compression of the collar biasing spring 240 by limiting the distance that the inlet cavity collar 220 may slide towards the gas port cavity collar 260. In one embodiment of the present invention, the collar biasing spring 240 is omitted.

In a preferred embodiment, all parts of the dynamic compound valve stem assembly 190 are made from anodized 6061-T6 aluminum. The collar biasing spring 240 is preferably made from 17-7 stainless steel.

FIG. 2B shows an internal view of the end nut 110. The end nut 110 comprises an inlet port 35, and inlet cavity 140, and an inlet seat 150. The inlet cavity 140 comprises one or more flow grooves 160. The inlet cavity 140 of end nut 110 has a first inner diameter 112 and a second inner diameter 114.

As shown in FIGS. 3A and 3B, the inlet cavity collar 220 has an outer diameter sized to fit within the first inner diameter 112 and larger than the second inner diameter 114, and the inlet port poppet 210 has an outer diameter sized to fit within the second inner diameter 114. The gas port cavity collar 260 has an outer diameter sized to fit within the third inner diameter 172 of the gas port cavity 170. In a preferred embodiment, the first inner diameter 112 is greater than the second inner diameter 114. In a preferred embodiment, the outer diameter of the inlet cavity collar 220 is about 0.795 inches and the first inner diameter 112 is about 0.800 inches, the outer diameter of the inlet port poppet 210 is about 0.605 inches and the second inner diameter 114 is about 0.610 inches, and the outer diameter of the gas port poppet 230 is about 0.605 inches and the third inner diameter 172 is about 0.610 inches. These preferred embodiment diameters yield a part tolerance for the inlet cavity collar 220 and first inner diameter 112 of about 0.0025 inches, which has been found to be ideal for drawing the inlet cavity collar 220 into the inlet cavity 140 as further described herein. In another embodiment, the part tolerance is about 0.004 to 0.003 inches. In another embodiment, the part tolerance is about 0.003 to 0.002 inches. In another embodiment, the part tolerance is about 0.002 to 0.001 inches.

FIGS. 3A and 3B illustrate the inlet cavity 140 and gas port cavity 170 having diameters smaller than the diameter of the diameter of chamber 120. However, two or more of these features could have the same or similar diameters as well. For example, the diameter of the chamber 120 and the gas port cavity 170 could be the same to form a contiguous diameter.

As shown in FIG. 3A, in a closed position, the inlet port poppet 210 rests against the inlet seat 150 and the inlet cavity collar 220 rests against the inlet port poppet 210 and within the first inner diameter 112 of inlet cavity 140. Inlet port poppet 210 is machined for o-ring 280 giving an efficient seal with inlet seat 150. The gas port poppet 230 maintains a flow gap 310 in the closed position to permit gaseous carbon dioxide from the boiling carbon dioxide in the liquid storage cylinder 60 to flow through, in turn, the gas passageways 270, flow gap 310, gas port 55, and gas port 50 into the gaseous storage cylinder 70.

As shown in FIG. 3B, in an open position, the gas port poppet 230 rests against the gas port seat 180 to prevent liquid carbon dioxide from flowing into the gaseous storage cylinder 70. Gas port poppet 230 is machined for o-ring 280 giving an efficient seal with gas port seat 180 during the filling process. The gas port cavity collar 260 travels within the gas port cavity 170 in both open and closed positions to maintain the axial position of the dynamic compound valve stem assembly 190 within the chamber 120. The inlet port poppet 210 remains within the second inner diameter 114 of the inlet cavity 140 in order to maintain the axial position of the dynamic compound valve stem assembly 190 within the chamber 120. Flow grooves 160 allow liquid carbon dioxide to flow around the inlet port poppet 210 when it is in an open position.

In an open position, the inlet cavity collar 220 is positioned outside of the inlet cavity 140 creating a flow gap 300. In a preferred embodiment, the flow gap 300 is about 0.20 inches, which has been found to be ideal for drawing the inlet cavity collar 220 into the inlet cavity 140 as further described herein. In another embodiment, the flow gap 310 is about 0.20 to 0.15 inches. In another embodiment, the flow gap 300 is about 0.15 to 0.10 inches. In another embodiment, the flow gap 300 is about 0.10 to 0.05 inches. The chosen flow gap dimension will also act like a throttle to control the desired flow rate for liquid carbon dioxide entering the chamber.

The liquid carbon dioxide storage and gas delivery system utilizing the control valve assembly 10 of the present invention is typically filled using a fill truck that supplies liquid carbon dioxide under pressure of about 800 to 1150 PSI. A hose from the truck is connected to fill port 30 and a pump is then activated to cause liquid carbon dioxide to flow through the hose and into the fill port 30. The fill pressure of the liquid carbon dioxide pushes inlet port poppet 210 away from inlet seat 150 causing the dynamic compound valve stem assembly 190 to seat the gas port poppet 230 against the gas port seat 180. Liquid carbon dioxide is thereby prevented from flowing through the gas port 55 into the gaseous storage cylinder 70 during filling.

The fill pressure of the liquid carbon dioxide forces the inlet cavity collar 220 to slide along stem body 200 and out of the inlet cavity 140 creating flow gap 300. Liquid carbon dioxide may then flow through flow gap 300 into chamber 120 and continue through liquid port 45 and liquid port 40 to fill the liquid storage cylinder 60. In one embodiment, the inlet cavity collar 220 is forced against collar bias spring 240 during filling. In another embodiment, there is no collar bias spring 240 and inlet cavity collar 220 may slide along stem body 200 to the stop 250 during filling. A cut-off pressure switch on the fill truck monitors the filling pressure and shuts off the pump on the truck when a pre-determined pressure is detected. The truck operator then vents the fill line which causes the pressure in the fill line to drop quickly, creating a large pressure differential between the pressure in the liquid storage cylinder 60 and pressure on the fill port 30 side of the control valve assembly 10, including within the inlet cavity 140. This pressure differential and the liquid carbon dioxide flow velocity towards the liquid port urges the inlet cavity collar 220 into inlet cavity 140 and against the inlet port poppet 210 which, in turn, urges the inlet port poppet 210 against inlet seat 150. Pressure in the closed system will then maintain the inlet port poppet 210 against inlet seat 150 to seal the inlet port 35. In one embodiment, the inertia of the inlet cavity collar 220 is sufficient to force the inlet port poppet 210 against inlet seat 150. In another embodiment, the collar bias spring 240 is used to urge inlet cavity collar 220 towards inlet cavity 140 when the pressure drops on the fill port 30 side of the control valve assembly 10. The collar bias spring 240 also overcomes any frictional resistance that may exist between the stem body 200 and collar bias spring 240. Once sealed, pressure within the chamber 120 forces the port poppet 210 against inlet seat 150 to maintain a closed position. In the closed position, the gas port poppet 230 is disengaged from gas port seat 180 to create flow gap 310 and permit gaseous carbon dioxide from boiling liquid carbon dioxide in the liquid storage cylinder 60 to flow through the gas passageways 270, the flow gap 310, gas port 55 and gas port 50 into the gaseous storage cylinder 70 until pressure and temperature equilibrium within the system has been reached. Carbon dioxide gas may be retrieved from the gaseous storage cylinder 70 through user port 80. While the liquid storage cylinders 60 are being filled, the system is still operational and gaseous carbon dioxide may be retrieved through user port 80.

The present invention has been described with reference to specific details of particular embodiments thereof. It is not intended that such details be regarded as limitations upon the scope of the claimed invention. It will be apparent that various modifications can be made without departing from the spirit and scope of the present invention. The precise scope of the invention is to be defined by the appended claims and equivalents thereto.

What is claimed is:

1. A control valve assembly for receiving and directing the flow of pressurized liquid carbon dioxide to a liquid storage cylinder and directing the flow of gaseous carbon dioxide to a gaseous storage cylinder, the control valve assembly having a closed position and an open position, comprising:
   a valve body comprising a chamber, a liquid inlet cavity, a liquid storage port, and a gas outlet cavity;
      wherein the liquid inlet cavity is in fluid communication with the chamber and a liquid inlet port;
      wherein the gas outlet cavity is in fluid communication with the chamber and the gaseous storage cylinder; and
      wherein the liquid storage port is in fluid communication with the chamber and the liquid storage cylinder;
   a valve stem assembly comprising a stem body having a first end and a second end, a first poppet interconnected to the first end, a second poppet interconnected to the second end, and a collar slideably interconnected to the stem body between the first and second poppets;
      wherein the first poppet is disposed within the liquid inlet cavity and the second poppet is disposed within the gas outlet cavity;
      wherein the first poppet is adapted to prevent gaseous carbon dioxide from escaping through the liquid inlet port in the closed position;
      wherein the second poppet is adapted to prevent liquid carbon dioxide from entering the gaseous storage cylinder in the open position;
      wherein the collar is adapted to slide along the stem body to form a flow gap for liquid carbon dioxide to enter the chamber from the liquid inlet cavity; and wherein the collar is adapted to be urged into the liquid inlet cavity by a pressure reduction in the liquid inlet cavity.

2. The control valve assembly according to claim 1, wherein the liquid inlet cavity comprises at least one flow groove.

3. The control valve assembly according to claim 2, further comprising a bias spring interconnected to the stem body between the second poppet and the collar, and adapted to bias the collar towards the first poppet.

4. The control valve assembly according to claim 2, wherein the application of pressurized liquid carbon dioxide to the liquid inlet port causes the collar to slide out of the inlet cavity.

5. The control valve assembly according to claim 2, wherein the collar is disposed substantially within the liquid inlet cavity in the closed position.

6. The control valve assembly according to claim 2, wherein the first poppet is threadably interconnected to the stem body.

7. The control valve assembly according to claim 2, wherein the second poppet is threadably interconnected to the stem body.

8. The control valve assembly according to claim 3, wherein the stem body comprises a stop adapted to prevent the collar from fully compressing the bias spring.

9. The control valve assembly according to claim 1, wherein the second poppet comprises a collar adapted to travel within the gas outlet cavity.

10. The control valve assembly according to claim 9, wherein the second poppet collar comprises one or more gas passageways.

11. A control valve assembly for receiving and directing the flow of pressurized liquid carbon dioxide comprising:
    a valve body comprising a chamber, a liquid inlet cavity, a liquid storage port, and a gas outlet cavity;
        wherein the liquid inlet cavity is in fluid communication with the chamber;
        wherein the gas outlet cavity is in fluid communication with the chamber;
        wherein the liquid storage port is in fluid communication with the chamber;
    a valve stem assembly comprising a stem body having a first end and a second end, a first poppet interconnected to the first end, a second poppet interconnected to the second end, and a collar interconnected to the stem body between the first and second poppets;
        wherein the first poppet is disposed within the liquid inlet cavity and the second poppet is disposed within the gas outlet cavity;
        wherein the collar is adapted to form a flow gap for liquid carbon dioxide to enter the chamber from the liquid inlet cavity; and
        wherein the collar is adapted to be urged into the liquid inlet cavity by a reduction in pressure in the liquid inlet cavity.

12. The control valve assembly according to claim 11, wherein the liquid inlet cavity further comprises at least one flow groove.

13. The control valve assembly according to claim 11, wherein the valve assembly further comprises a bias spring interconnected to the stem body.

14. The control valve assembly according to claim 11, wherein the first poppet and/or the second poppet is threadably interconnected to the stem body.

15. The control valve assembly according to claim 11, wherein the collar is slideably interconnected to the stem body.

16. The control valve assembly according to claim 15, wherein the stem body further comprises a stop for preventing the collar from sliding along the full length of the stem body.

17. The control valve assembly according to claim 11, wherein the second poppet comprises a collar adapted to travel within the gas outlet cavity.

18. The control valve assembly according to claim 17, wherein the second poppet collar comprises one or more passageways.

19. A control valve assembly for receiving and directing the flow of pressurized liquid carbon dioxide and gaseous carbon dioxide, the control valve assembly having a closed position and an open position, comprising:
    a valve body comprising a chamber, a liquid inlet, a liquid inlet cavity, a liquid outlet, gas outlet, and a gas outlet cavity;
    a valve stem assembly disposed within the valve body comprising a stem body having a first poppet end, a second poppet end, and a collar between the first and second poppets;
        wherein the first poppet is disposed within the liquid inlet cavity and the second poppet is disposed within the gas outlet cavity;
        wherein the first poppet is adapted to prevent gaseous carbon dioxide from escaping through the liquid inlet in the closed position;
        wherein the second poppet is adapted to prevent liquid carbon dioxide from escaping through the gas outlet in the open position;
        wherein the collar is adapted to be urged into the liquid inlet cavity by a pressure reduction in the liquid inlet cavity; and
    wherein in the open position the flow of pressurized liquid carbon dioxide is directed to the liquid outlet and in the closed position the flow of gaseous carbon dioxide is directed to the gas outlet.

20. The control valve assembly according to claim 19, wherein the valve assembly further comprises a bias spring interconnected to the stem body.

* * * * *